United States Patent [19]

Cooke et al.

[11] Patent Number: 5,032,952

[45] Date of Patent: Jul. 16, 1991

[54] PIVOTING POWER SUPPLY

[75] Inventors: Kevin K. Cooke; Dennis Crompton, both of Delray Beach; John R. Dewitt, Boca Raton; Paul A. Kerezman, Royal Palm Beach, all of Fla.

[73] Assignee: International Business Machines Corporation, Armonk, N.Y.

[21] Appl. No.: 434,650

[22] Filed: Nov. 13, 1989

[51] Int. Cl.[5] .................... H05K 7/00

[52] U.S. Cl. .................... 361/392; 361/340; 361/334; 361/395

[58] Field of Search .................... 361/391, 392, 395, 396, 361/413, 415, 340; 248/455; 219/297; 16/297, 366; 364/709.01; 439/92, 95, 96, 345, 359, 372, 246, 247, 248, 534; 74/52.1

[56] References Cited

U.S. PATENT DOCUMENTS 2,572,618 2/1950 Haury et al. .................... 361/391

4,625,259 11/1986 Krechmer et al. .................... 361/340

FOREIGN PATENT DOCUMENTS 675659 12/1963 Canada .................... 361/340

OTHER PUBLICATIONS

IBM Series 1 Maintenance Manual, 1983.

*Primary Examiner*—Leo P. Picard

*Assistant Examiner*—Donald A. Sparks

*Attorney, Agent, or Firm*—Richard A. Tomlin; Stephen A. Terrile

[57] ABSTRACT

A pivotable power supply for a computer rotates away from the computer circuit board so that servicing of system components located behind the power supply is facilitated. The power supply is provided with a ground strap which remains attached during power supply pivoting thus assuring that the power supply will be grounded after system servicing. Also, a threaded, spring-loaded fastener for locking the power supply in position is designed such that the covers cannot be replaced on the housing unless the power supply is connected to the system circuit board.

11 Claims, 12 Drawing Sheets

1 17 13 9 27 26 28 11

5
39
41
9
27
37
43
11

39
41
37
5
9
27
43
11

PIVOTING POWER SUPPLY

BACKGROUND OF THE INVENTION

As computers become smaller it becomes increasingly difficult to service the internal components of the computer because of space constraints. One of the largest components in a computer is the power supply which is used to convert the normal ac current available from wall outlets to the dc current needed for the operation of the computer. Conventionally, these power supplies are attached by bolts to the frame of the computer. To obtain access to components which are blocked by the power supply, it is desirable to use a power supply that may be pivoted out of position so that components located adjacent the power supply may be more easily serviced.

SUMMARY OF THE INVENTION

A pivotable power supply is provided to aid the servicing of computers. The power supply is provided with a grounding strap which is bolted to the power supply and to the frame of the computer. The grounding strap remains attached to the power supply as the power supply pivots. The power supply rotates away from the computer system board allowing free access to system board components that are located adjacent to or under the power supply.

An improved power supply fastener and "floating connector retainer" and connector are also provided to supply the necessary support and electrical connections for the power supply.

BRIEF DESCRIPTION OF THE DRAWING

Similar parts have been given similar designations in the various figures.

DETAILED DESCRIPTION OF THE PREFERRED EMBODIMENTS

Figure 1:
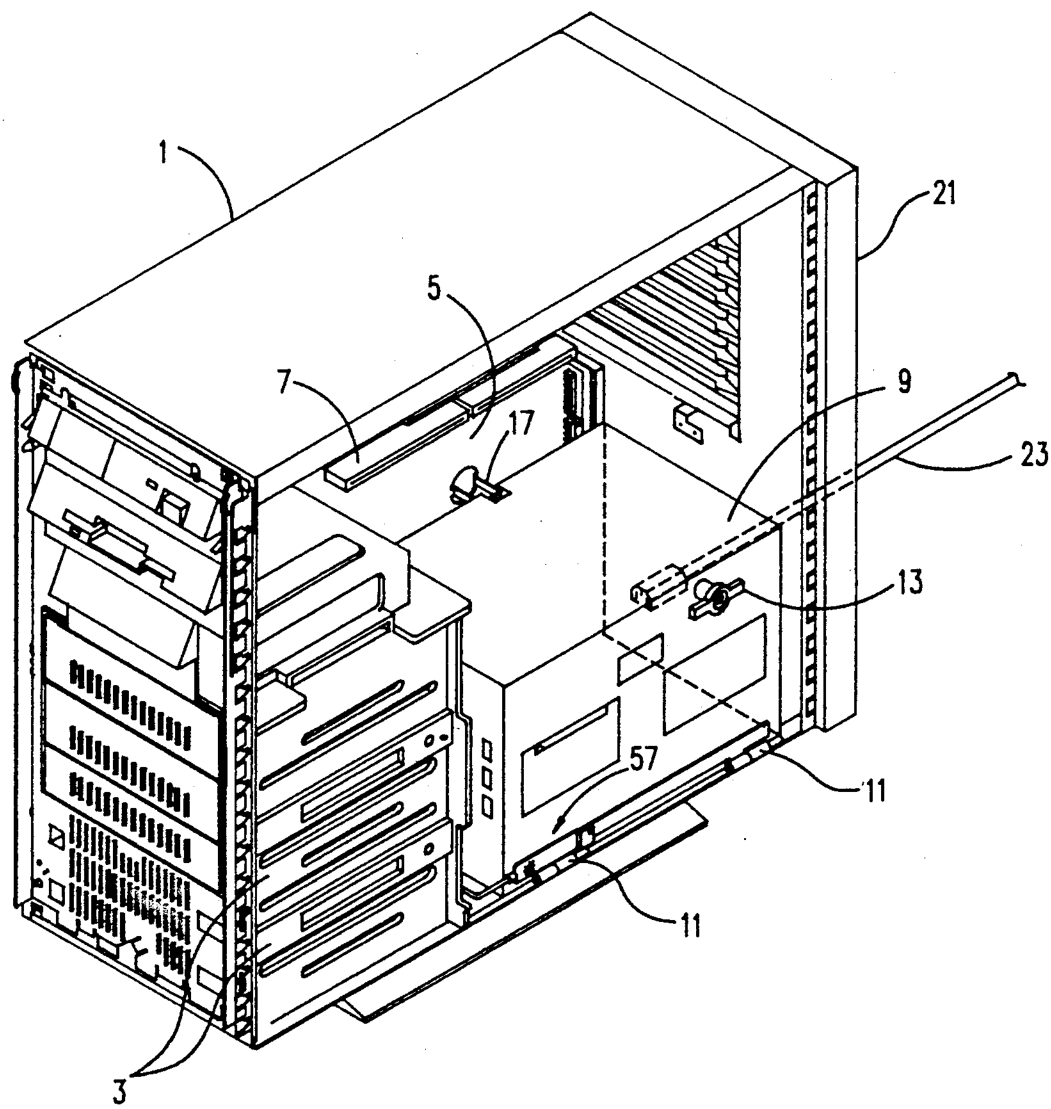
FIG. 1 is a perspective view of the front and power supply side of a computer processor incorporating a pivoting power supply in accordance with this invention with the front and side covers removed.
Figure 2:
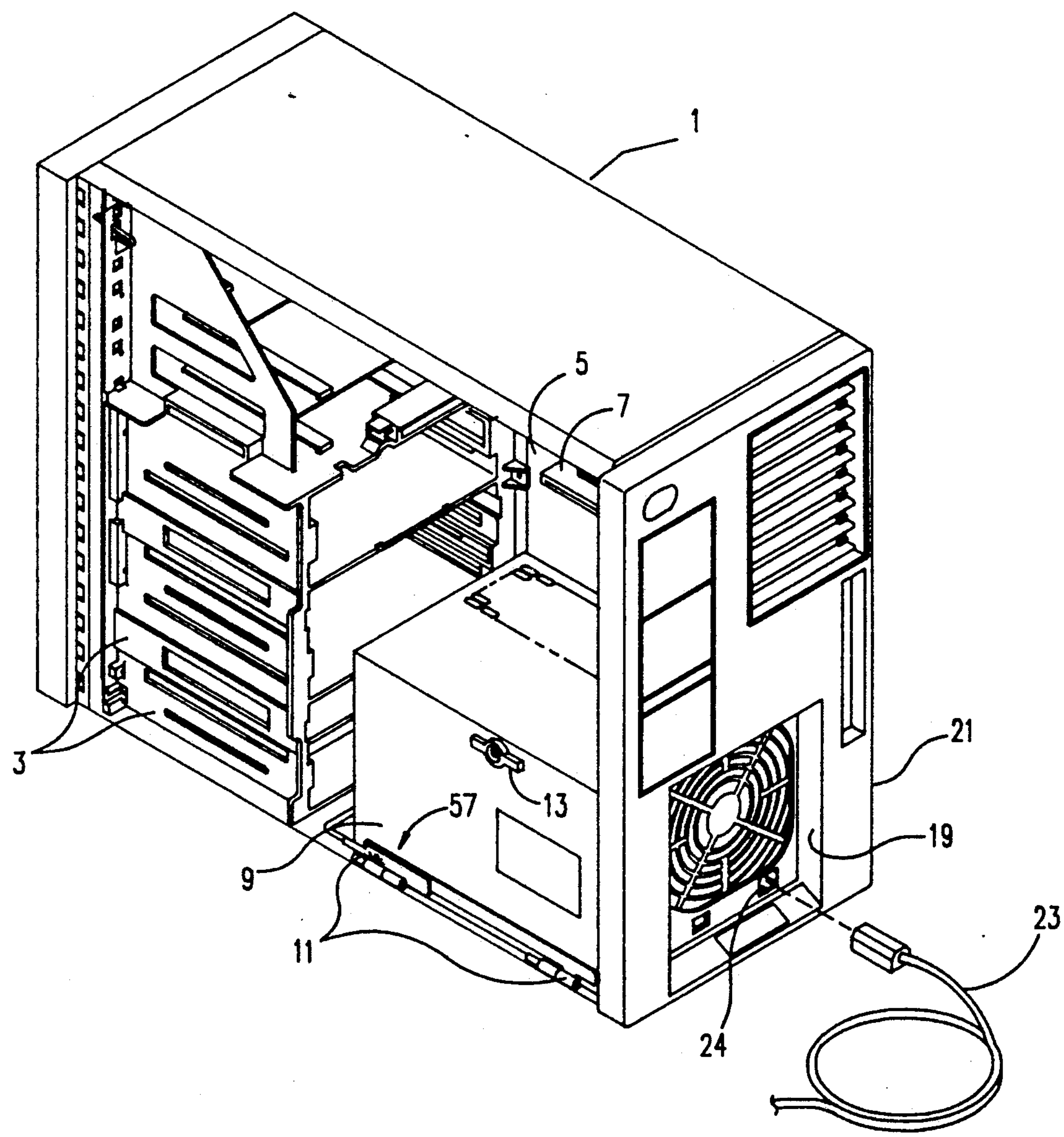
FIG. 2 is a perspective view of the back and the power supply side of the computer processor as shown in FIG. 1 with the side cover removed.
Figure 3:
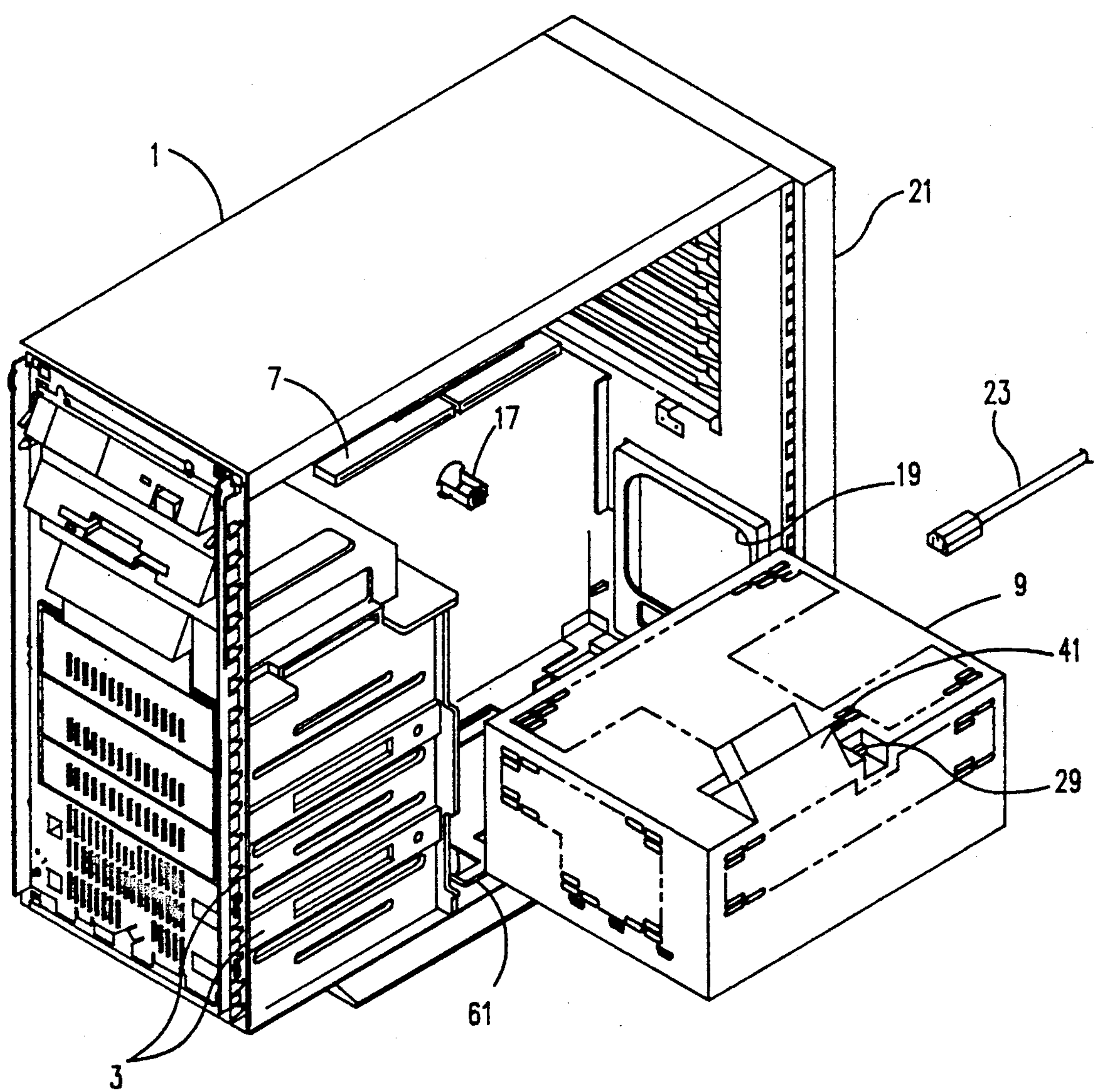
FIG. 3 is a perspective view of a computer processor incorporating a pivoting power supply in accordance with this invention with the power supply rotated to the open position, and with the front and side covers and the system circuit board removed.

With reference to FIGS. 1, 2 and 3 there is seen a computer housing assembly 1, which includes supports 3 for disk drives, a power supply 9 and a system circuit board 5 which has resident thereon various components and slots 7 for addition of adapter cards and other components. A pivotable power supply 9 is pivotally mounted on hinges 11. A fastener 13, and a ground connector strap shown generally as 57 are provided to support the power supply 9 within the computer processor housing 1 and to make the necessary electrical connections to the system circuit board 5. Fastener 13 is rotatably mounted in power supply 9 and is designed to screw into fastener support 17. Fastener support 17 is mounted on housing 1 to support power supply 9 in combination with fastener 13. An aperture 19 in the back housing cover 21 allows the connection of a power cord 23. Power cord 23 is used to connect power supply 9 to electrical power from a wall outlet through leads 24.

Figure 4:
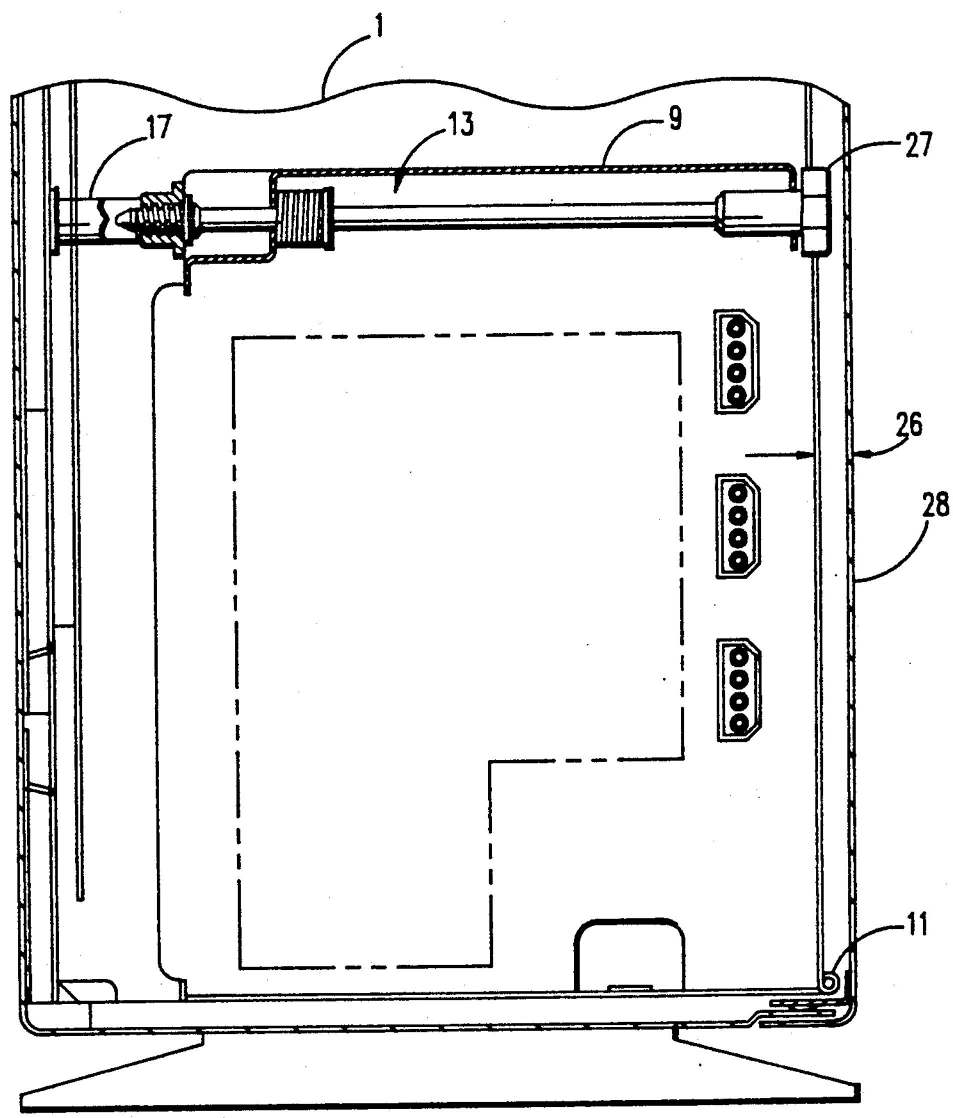
FIG. 4 is a partial back sectional view showing the power supply in the locked position within the computer processor.

Referring now to FIG. 4, there is shown a partial back sectional view of housing 1 and power supply 9, fastener 13 and support 17 in the power supply locked position.

Figure 5A:
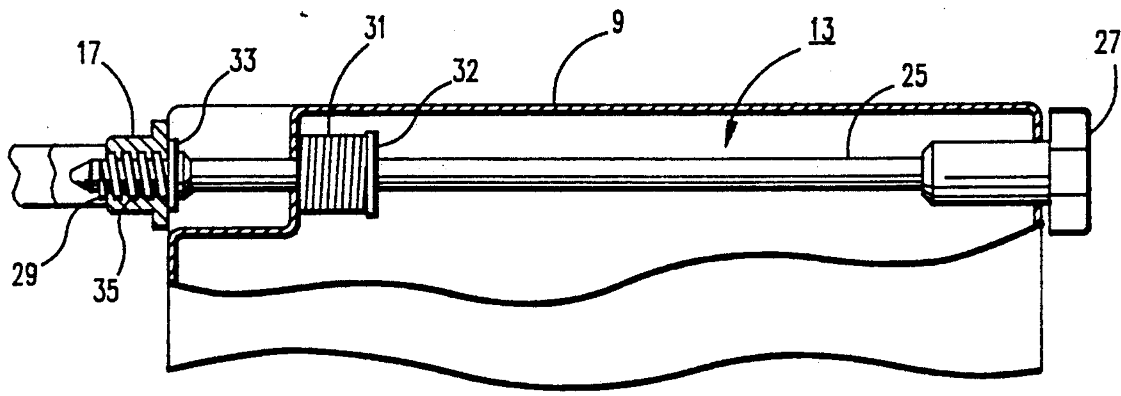
FIGS. 5A and 5B are partial back sectional views showing the fastener in its power supply locked and unlocked positions respectively.
Figure 5B:
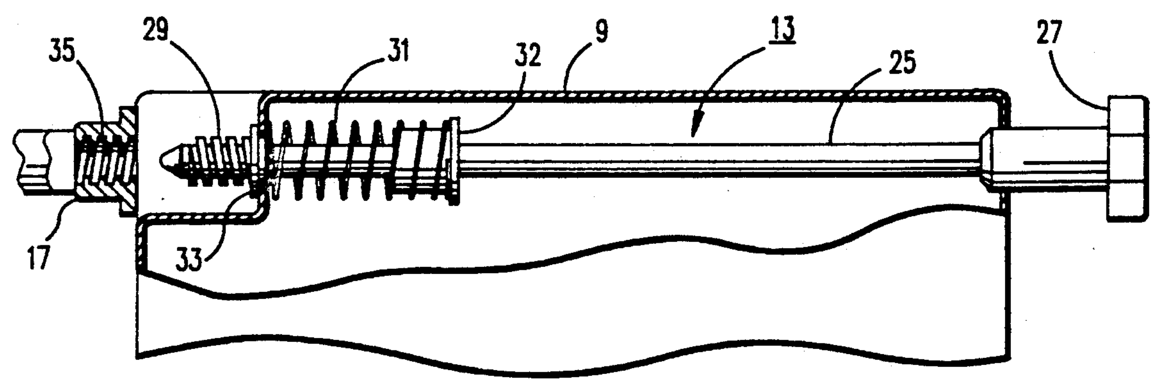

Referring now to FIGS. 5A and 5B there is shown in detail the structure of the preferred fastener 13 which includes shaft 25 having fixed thereon for rotation with shaft 25, handle 27. The opposite end of shaft 25 has fixed thereto for rotation therewith a male threaded portion 29. A spring 31 is provided to bias fastener 13 towards the handle 27 end. Spring 31 is retained on shaft 25 by shoulder 32 which is fixed to shaft 25 for rotation with shaft 25. To lock power supply 9 in place fastener 13 is rotated by handle 27 while pressing against the bias of spring 31 to engage the male threaded portion 29 of fastener 13 with the corresponding female threads 35 in fastener support 17. To unlock power supply 9 and fastener 13 from support 17 the handle 27 is turned to unscrew fastener 13 from support 17. When the threaded portions of the fastener 13 and support 17 disengage spring 31 forces shaft 25 to the right as seen in FIG. 5B pulling the threaded end portion of shaft 25 well clear of the support 17. This movement of shaft 25 is required to allow the pivoting of power supply 9 around hinges 11 without shaft 25 contacting support 17, such contact would prevent or hinder pivoting of power supply 9. A "C" shaped washer 33 locks shaft 25 in power supply 9 against the bias of spring 31. When the power supply 9 is in the fully open position as shown in FIG. 3, handle 27 acted on through shaft 25 by spring 31 further acts as a resilient stop should power supply 9 be accidentally dropped. Handle 27 is also used to pivot power supply 9. The design of fastener 13 further ensures that the power supply is locked in place after servicing. Referring back to FIG. 4 the distance 26 between power supply 9 and cover 28 is insufficient to allow cover 28 to be installed unless fastener 13 is engaged in support 17.

Figure 6:
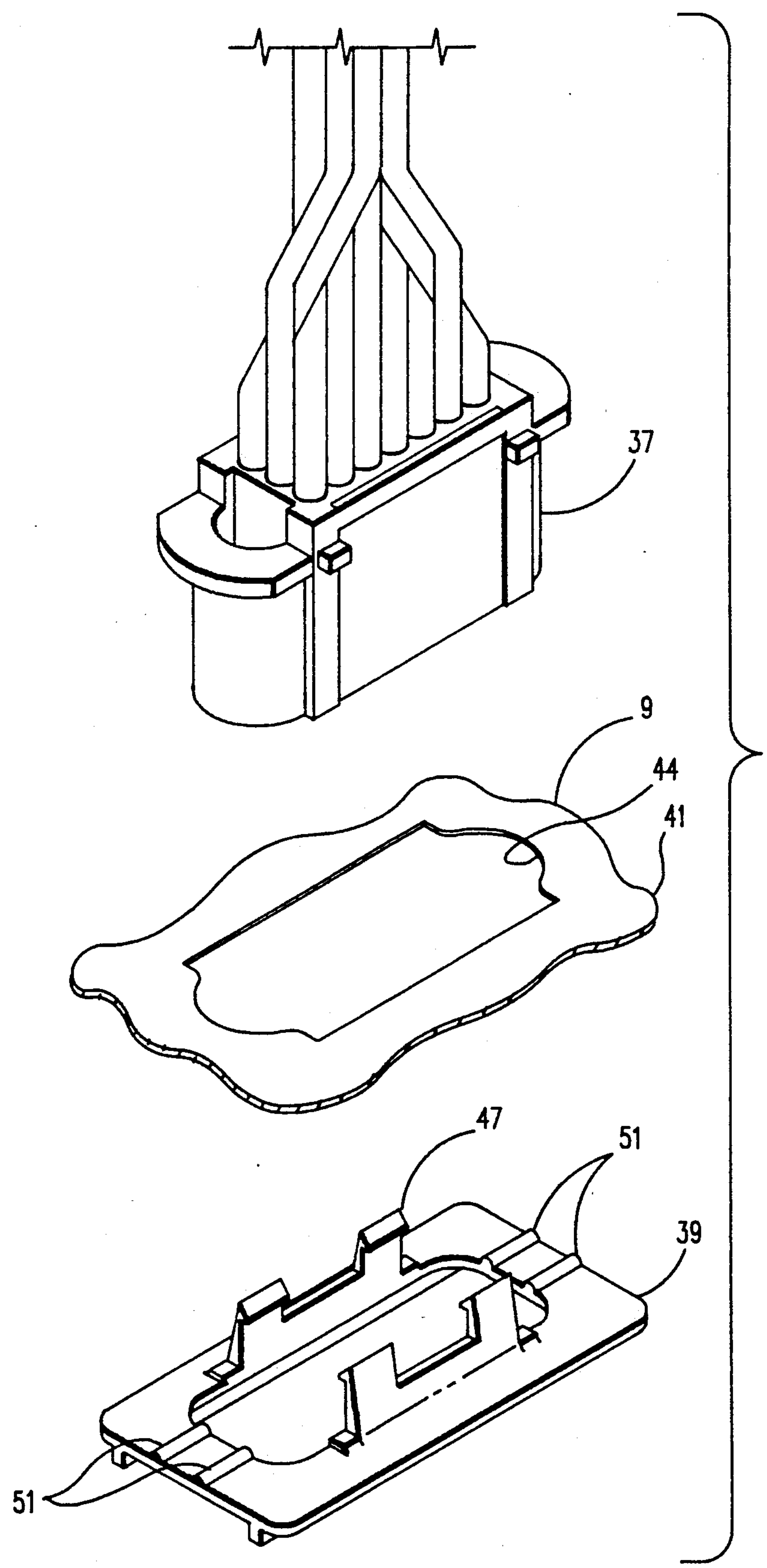
FIG. 6 is an exploded view of a floating connector and connector retainer assembly for use with the power supply of this invention.

Referring now to FIG. 6 there is shown a connector 37, power supply 9 and floating connector retainer 39 for use with the power supply of this invention. Referring back to FIG. 3 a raised portion 41 of the power supply housing is provided to orient the connector retainer 39 (not shown in FIG. 3) and the connector 37 in a position to allow connector 37 to engage circuit board connector 43 (see FIGS. 10A and 10B) in response to the pivoting of power supply 9.

Figure 7:
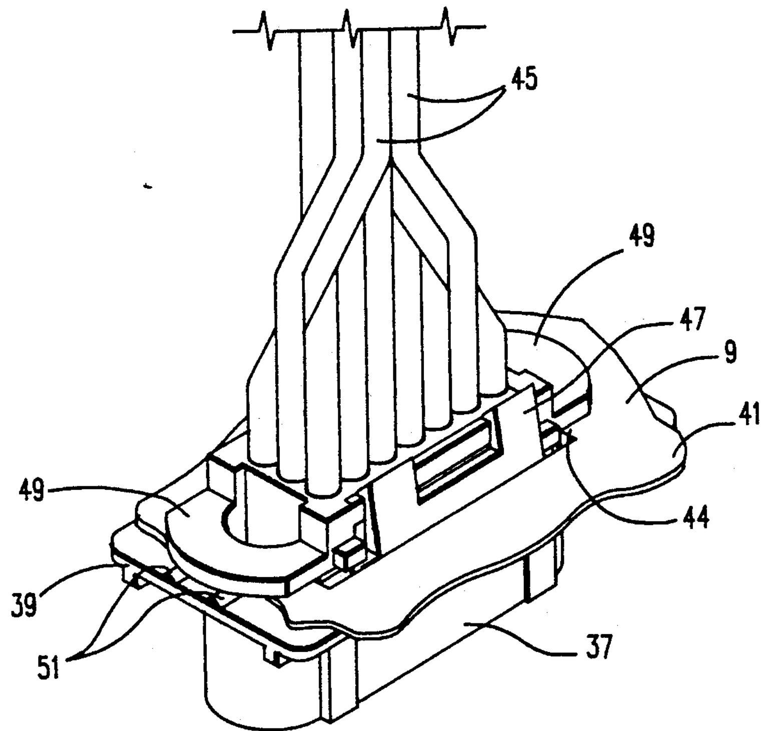
FIG. 7 is a perspective view of the assembled floating connector and connector retainer of this invention.
Figure 8A:
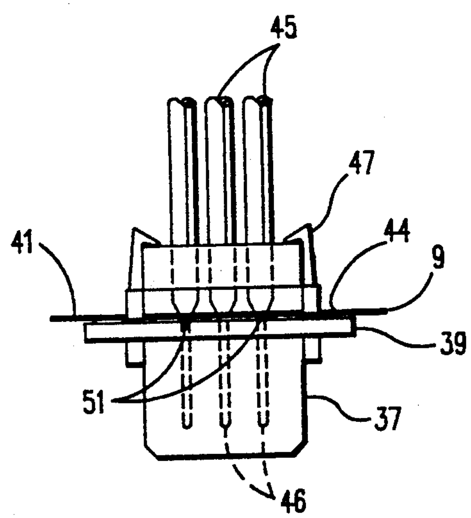
FIGS. 8A and 8B are end views and side views of the assembly of FIG. 7 respectively.
Figure 8B:
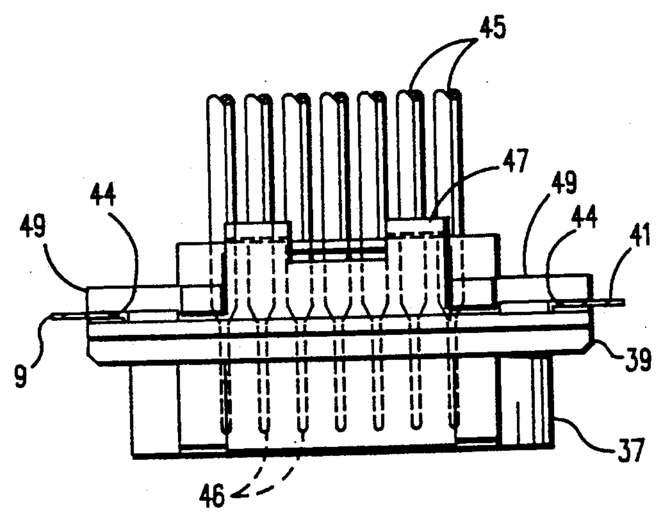

Referring now to FIGS. 7 and 8A and 8B, there is shown a connector 37 and connector retainer 39 assembled in power supply raised portion 41. To assemble, connector retainer 39 is positioned in aperture 44 in power supply raised portion 41. Connector 37 having power cables 45 terminating in connector pins 46 is pressed into connector retainer 39 until snap fasteners 47 are engaged. As can be seen from FIGS. 7, 8A and 8B, the power supply raised portion 41 is sandwiched between retainer connector 39 and connector 37 ears 49. The cross section of the portions of connector 37 and connector retainer 39 which are within aperture 44 in power supply raised portion 41 are smaller than aperture 44 as can be seen in FIGS. 7, 8A and 8B. This allows the connector retainer 39 and connector 37 assembly to move, or float relative to the power supply housing raised portion 41. Ears 49 on connector 37 and the body of connector retainer 39 prevent the assembly passing through aperture 44.

Figure 9A:
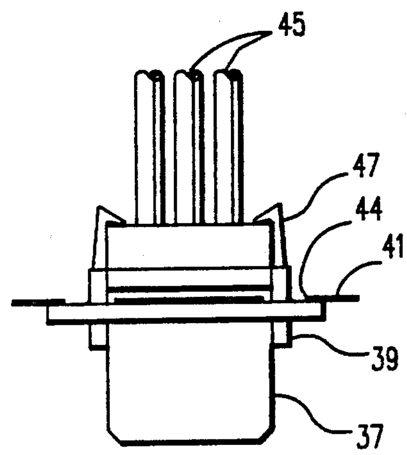
FIGS. 9A–9D are end views of the assembly of FIG. 7 showing the effect of adding supporting ribs to the connector retainer.
Figure 9B:
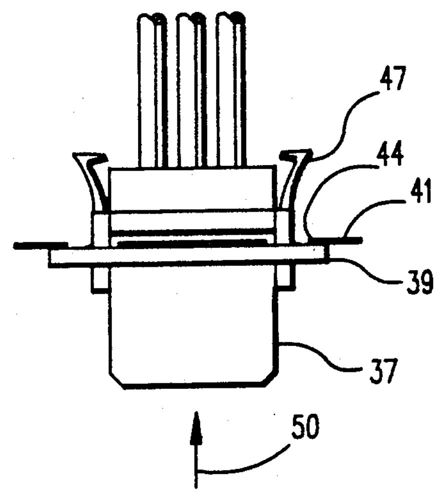
Figure 9C:
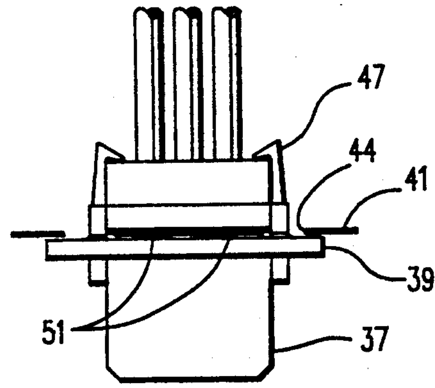
Figure 9D:
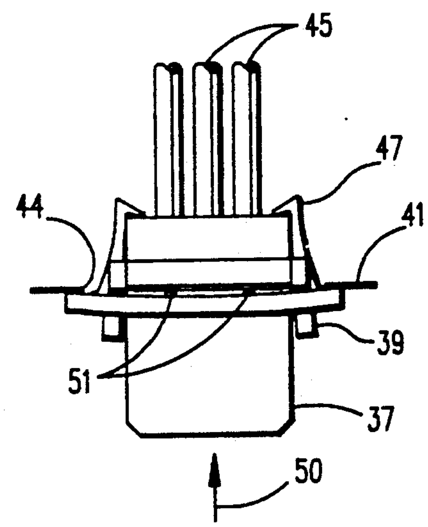

Referring now to FIGS. 9A and 9B there is shown connector retainer 39 without one of the features of this invention. It has been found that when pressure is applied to connector 37 in the direction of arrow 50 in FIG. 9B that the snap fasteners 47 can be bowed out releasing connector 37 from retainer 39 as shown in FIG. 9B. To prevent this bowing of snap fasteners 47, ribs 51 are provided on the connector retainer to cause the snap fasteners 47, in response to pressure in direction 50, to more firmly engage the connector 37 as shown in FIGS. 9C and 9D. The location of ribs 51, shown best in FIG. 7 reverse the rotation of motion of snap fasteners 47 when connector 37 is placed under pressure.

Figure 10A:
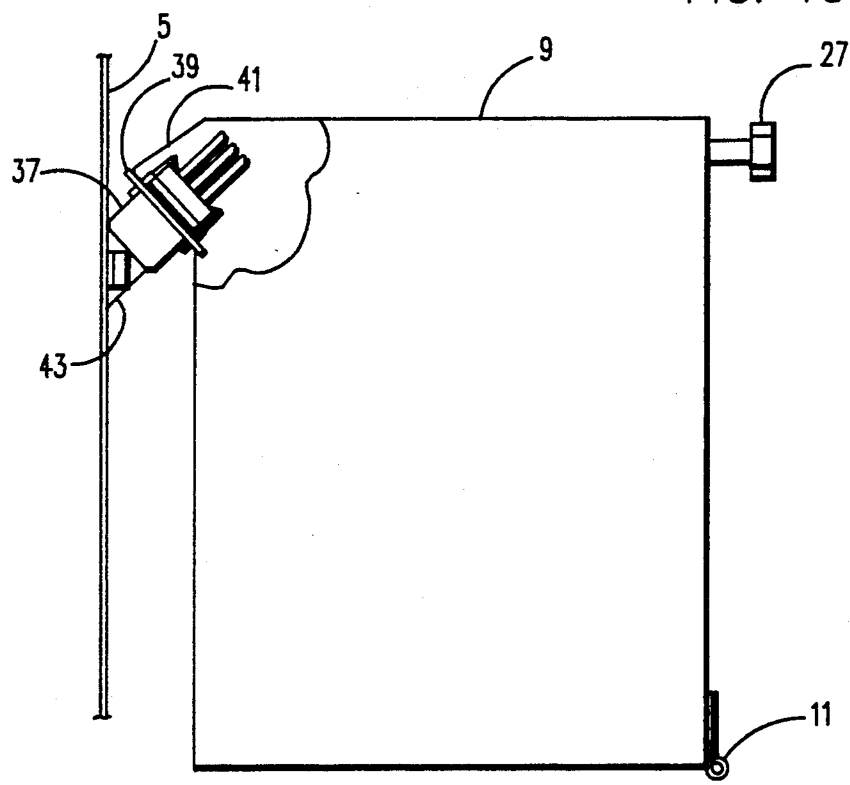
FIGS. 10A and 10B are views showing the pivoting motion of the power supply and the power supply connector and how this motion provides engagement of the power supply connector and the system circuit board connector.
Figure 10B:
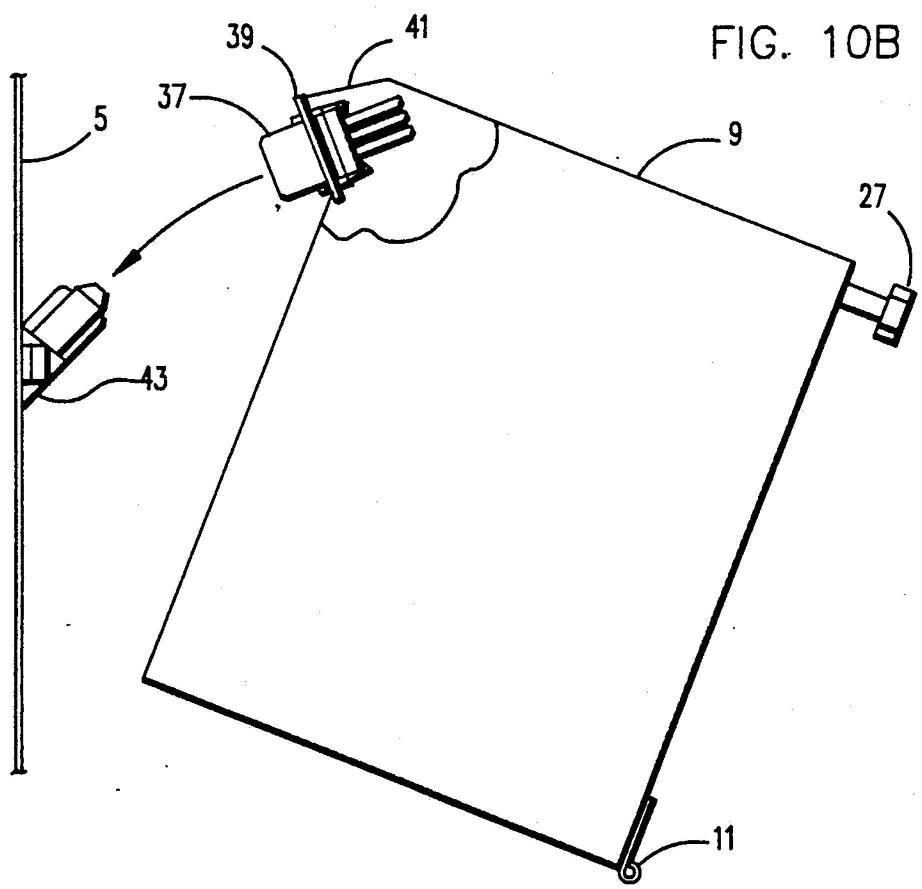

Referring now to FIGS. 10A and 10B there is shown end views of power supply 9, associated connector 37 and connector retainer 39 showing how the power supply connector 37 of the power supply is engaged with the system circuit board connector 43 on circuit board 5. Connectors 43 and 37 are aligned tangentially to the arc described by the pivoting of power supply 9. The act of pivoting power supply 9 engages or disengages the connectors 43 and 37. This is a safety feature in that the system circuit board 5 cannot be worked on with the power still connected because system board 5 is located behind power supply 9.

Figure 11:
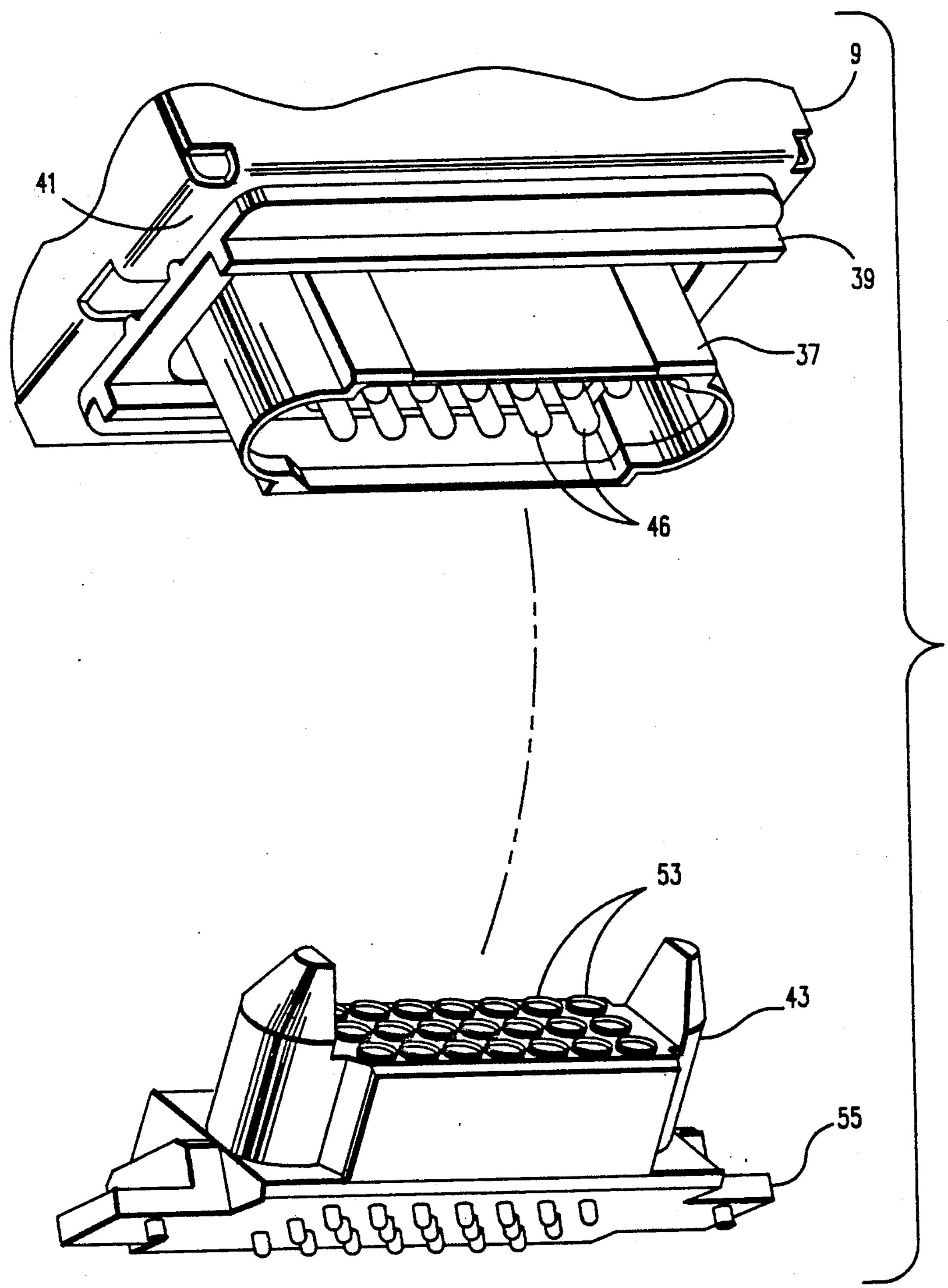
FIG. 11 shows details of the power supply and system circuit board connectors.

Referring now to FIG. 11 there is shown a more detailed view of power supply connector 37 and system circuit board connector 43. System board connector 43 is mounted on system circuit board 5 (see FIGS. 10 A and 10B) and is accordingly fixed in housing 1. As can be seen in FIG. 11, connector 43 has a base 55. Base 55 is mounted on system circuit board 5. The connector 43 and its pin sockets 53 are aligned such that when power supply 9 and power supply connector 37 are pivoted toward the system board the pins 46 in connector 37 are aligned with their respective pin sockets 53 in system circuit board connector 43. The two connectors 37 and 43 are aligned parallel to the tangent of the arc described by the power supply as it pivots.

Figure 12:
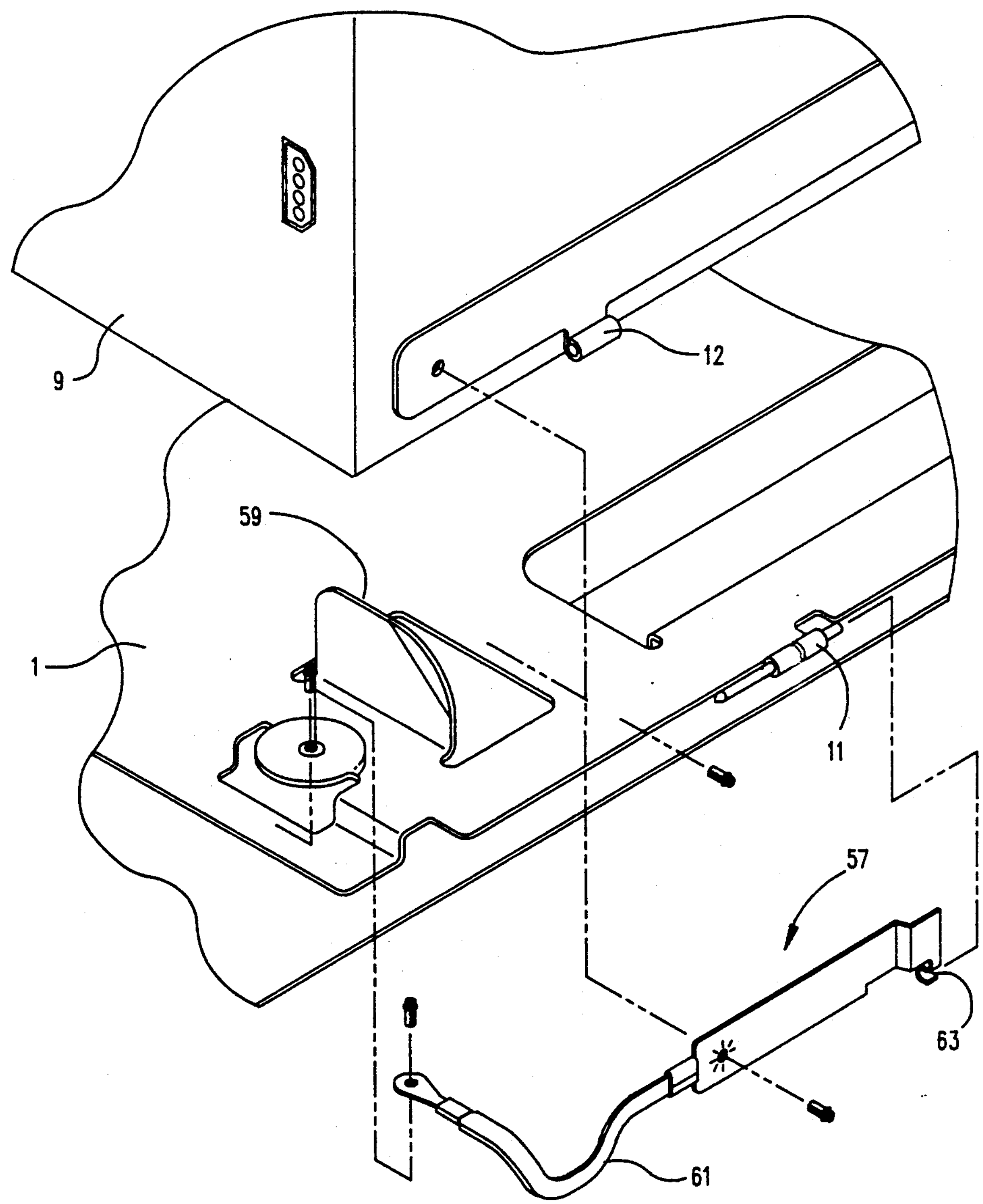
FIGS. 12 and 13 show the power supply ground strap assembly in accordance with this invention.
Figure 13:
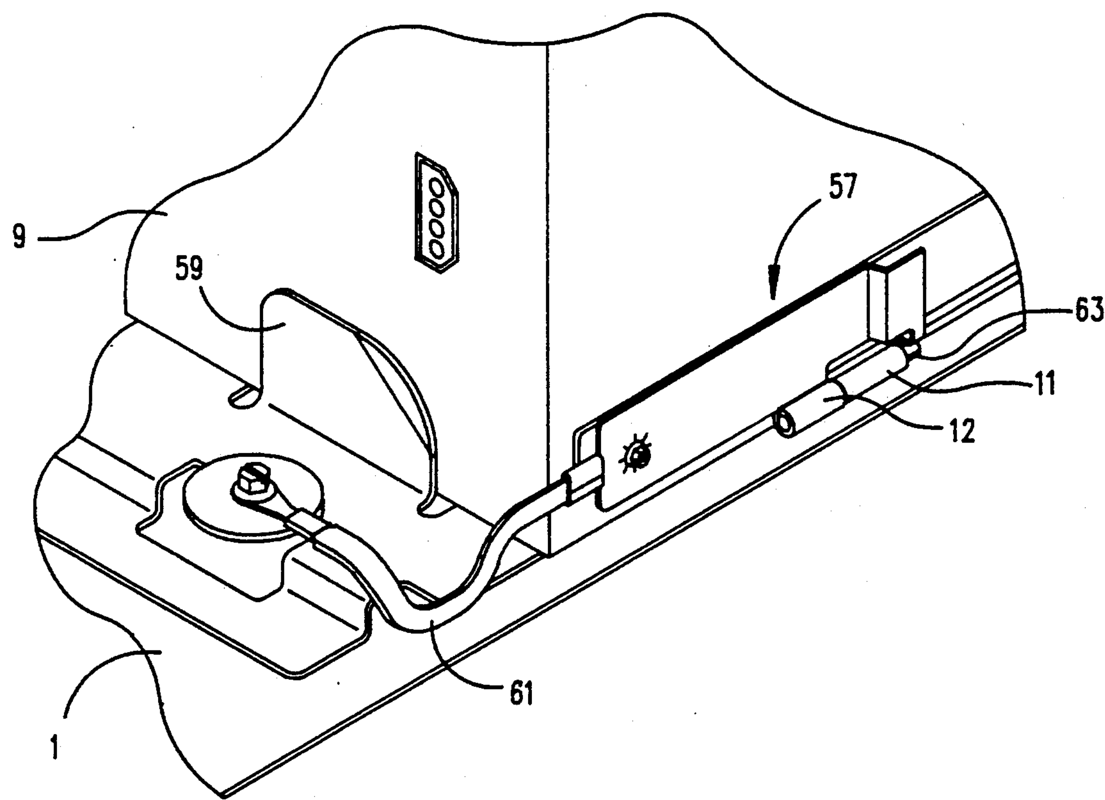

Referring now to FIGS. 12 and 13 there is shown a perspective view of a ground strap assembly shown generally as 57, and portions of the power supply 9, base of the housing 1, and one of two similar friction detents 59. To assemble, power supply hinge support 12 is slipped onto the pin of hinge 11. Power supply 9 is pivoted into frictional contact against friction detent 59. The power ground strap ear 63 is slipped over the hinge pin so that the hinge 11 is sandwiched between support 12 and ear 63. The power supply ground strap 57 is then bolted to housing 1 and the housing of power supply 9. Once the ground strap 57 is bolted in place the power supply 9 cannot accidentally slip off of hinge 11. As power supply 9 pivots around hinge 11, wire wound cable 61 twists with it. It is thus not necessary to remove cable 61 when power supply 9 is pivoted, ensuring that the power supply housing is always grounded to the computer housing. Friction detent 59 and a similar detent (not shown) located on the opposite side of power supply 9 each press inward against the housing of power supply 9 and frictionally retain it in position until the power supply is unlocked and pulled free of frictional contact with detents 59.

While the invention has been described with respect to a specific preferred embodiment thereof, it is to be understood that other modifications and variations may be made and still fall within the scope of the following claims.

What is claimed is:

1. A power supply for powering a personal computer having a system circuit board and a housing, said power supply being pivotable around a hinge and including a power supply fastener for locking said power supply into position in the housing, said fastener including a shaft having engaging means for engaging a support fixed to the housing to thereby lock said power supply in the housing, said fastener further having biasing means to bias said shaft and said engaging means away from said support when said shaft is not engaging said housing.

2. The power supply of claim 1 wherein said fastener shaft axis is vertical to the axis of said power supply hinge.

3. The power supply of claim 1 wherein said fastener shaft has a handle for pivoting said power supply.

4. A power supply for powering a personal computer having a system circuit board and a housing, said power supply being pivotable around a hinge and including a power supply connector mounted thereon for tangential connection with a connector mounted within the housing of the personal computer.

5. The power supply of claim 4 wherein said connector mounted within said housing is aligned tangentially to the arc described by the pivoting of said power supply around said hinge.

6. A power supply for powering a personal computer having a system circuit board and a housing, said power supply being pivotable around a hinge and including a ground strap assembly electrically connected to said power supply and the housing on which said hinge is located, said ground strap being mounted for pivoting with said power supply, said ground strap assembly securing said power supply to said hinge.

7. The power supply of claim 6 wherein said ground strap has means for preventing said power supply from slipping off the hinge pin of said hinge.

8. A power supply for powering a personal computer having a system circuit board and a housing, said power supply being pivotable around a hinge and having a connector and connector retainer assembly mounted on said power supply for floating movement relative to said power supply by being supported in an aperture larger than the cross-section of said connector and said connector retainer assembly.

9. The power supply of claim 8 wherein said connector retainer has ribs positioned such that when pressure is applied to said connector, the connector retainer fasteners are urged toward the connector.

10. A connector assembly for connecting a power supply to a system circuit board of a personal computer, the power supply being pivotable around a hinge, the combination comprising a connector, and a connector retainer assembly including connector retainer fasteners and ribs, said ribs being positioned such that when pressure is applied to said connector, said connector retainer fasteners are urged toward said connector.

11. A connector assembly comprising a connector, and a connector retainer assembly including connector retainer fasteners and ribs, said ribs being positioned such that when pressure is applied to said connector, said connector retainer fasteners are urged toward said connector.

* * * * *